(No Model.)
N. J. JOHNSON.
SEPARABLE COUPLING FOR COLTER YOKES.
No. 478,796. Patented July 12, 1892.
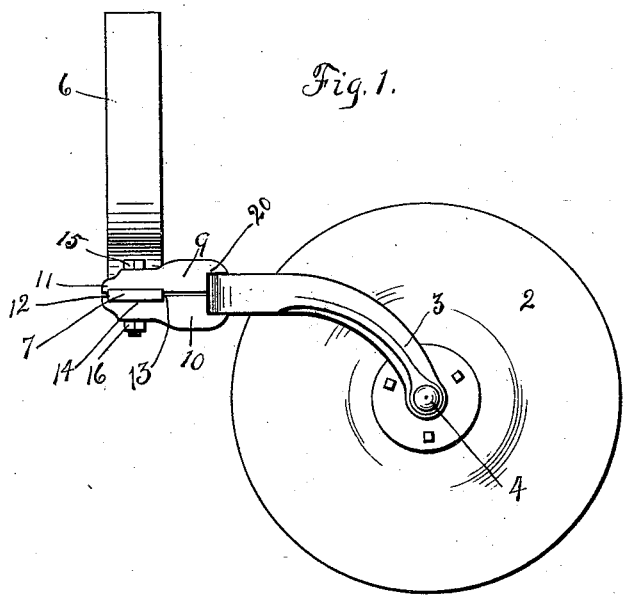
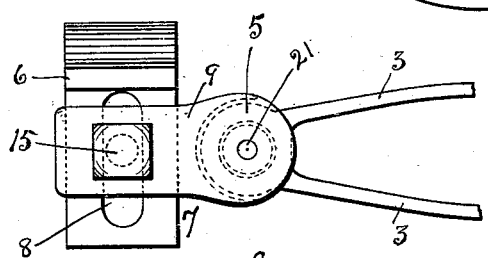
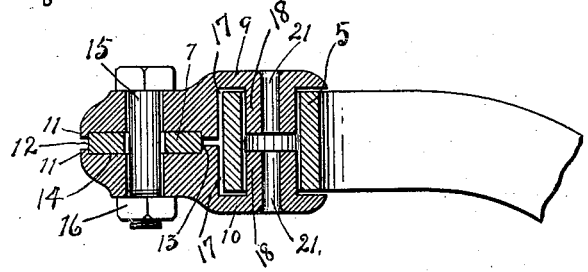
Witnesses.
C. H. Hill
O. F. Hawley
Inventor
Nils J. Johnson
By Paul & Merwin Attys.

UNITED STATES PATENT OFFICE.

NILS J. JOHNSON, OF MINNEAPOLIS, MINNESOTA, ASSIGNOR TO THE MINNEAPOLIS PLOW WORKS, OF SAME PLACE.

SEPARABLE COUPLING FOR COLTER-YOKES.

SPECIFICATION forming part of Letters Patent No. 478,796, dated July 12, 1892.

Application filed November 30, 1891. Serial No. 413,541. (No model.)

*To all whom it may concern:*

Be it known that I, NILS J. JOHNSON, of Minneapolis, in the county of Hennepin and State of Minnesota, have invented certain Improvements in Separable Couplings for Colter-Yokes, of which the following is a specification.

My invention relates to a cheap and convenient coupling whereby the yoke of a caster-colter is connected with the shank secured upon the plow-beam; and its object is to arrange a coupling and the yoke in as few parts as possible and to make their construction as simple as consistent with strength and durability.

To this end my invention consists in general in the construction and combination hereinafter described, and particularly pointed out in the claims.

My invention will be more readily understood by reference to the accompanying drawings, in which—

Figure 1 is a side elevation of a colter-yoke and coupling embodying my invention. Fig. 2 is an enlarged plan view of my coupling. Fig. 3 is a vertical section thereof on the line x x of Fig. 2.

As shown in the drawings, the colter 2 may be of any desired construction, and is secured between the sides 3 of the yoke by the bolt or short shaft 4. The upper end of the yoke has the form shown best in Figs. 2 and 3, the eye or sleeve 5 being arranged therein. The shank 6 is of the ordinary form, adapted to be fastened upon the plow-beam by the usual clip or clamp, and has the horizontal foot 7, provided with the slot 8. The coupling is arranged in two parts 8 and 10, exact duplicates of one another, and each provided with a lug or rib 11, adapted to engage the edge 12 of the foot 7. This lug and the shoulder 13 on each piece are made by grooving the inner face 14 of the piece, so as to accommodate the shank. The two parts are fastened upon the shank by the bolt 15, secured by the burr 16 and passing through the slot 8 of the shank-foot. The other end of the coupling is rounded, as shown, and each part is internally recessed, being provided with a groove 17, surrounding the neck or lug 18 on each piece. The eye or sleeve 5 of the yoke is adapted to enter these grooves and the lugs 18 to enter the opening of the sleeve, thereby securing the yoke firmly in the coupling. The sides 20 of the coupling-pieces are cut away, as shown in Fig. 1 and by the dotted lines in Fig. 2, so as to allow a free swinging movement of the yoke in the coupling-fastening. For the sake of lightness the necks or lugs 18 are made hollow, as shown. Further, in case of wearing of the parts a small bolt could be inserted through the holes 21 to temporarily secure them. In this way I provide a strong simple coupling between the yoke and the shank, which coupling may by loosening the bolt 15 be readily removed or the parts thereof spread open to admit of the removal of the eye or sleeve of the yoke from engagement therewith. These parts being made of malleable cast iron are very inexpensive.

Having thus described my invention, I claim as new and desire to secure by Letters Patent—

1. The combination, in a coupling, of the colter and the yoke thereof with the shank, said yoke provided with a sleeve, and the two grooved parts 9 and 10, arranged to engage said sleeve and to be bolted upon said shank.

2. The combination, with the colter-yoke, of the shank, the longitudinally-divided coupling consisting of the parts 9 and 10, said parts having lugs and shoulders to engage the edges of the shank-foot, said foot provided with a slot, the bolt passing through the same and securing said parts on said foot, and means for pivotally securing said yoke between said parts, substantially as described.

3. The combination, with the colter and the yoke wherein the same is secured, of the shank, said yoke provided with the eye or sleeve 5, the foot of said shank being slotted, the longitudinally-divided coupling having lugs and shoulders to engage the edges of said foot, openings in the same, and a bolt passing therethrough and through the slot in said foot for securing said part thereon, said parts provided with the groove 17 and the annular lugs 18 for receiving and engaging the sleeve of said yoke, substantially as described.

In testimony whereof I have hereunto set my hand this 11th day of November, 1891.

NILS J. JOHNSON.

In presence of—
C. G. HAWLEY,
F. S. LYON.